Oct. 31, 1961   G. A. LYON   3,006,691
WHEEL COVER
Filed May 19, 1958   2 Sheets-Sheet 2
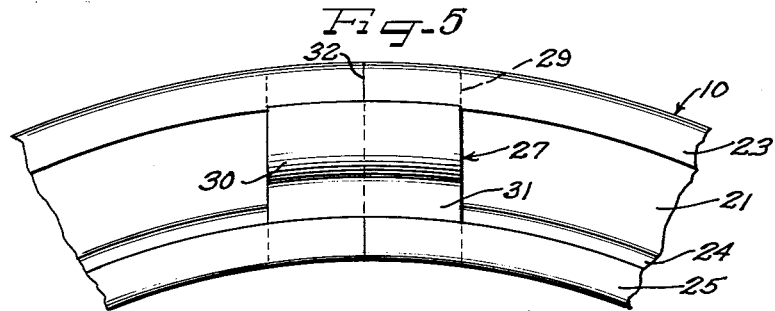
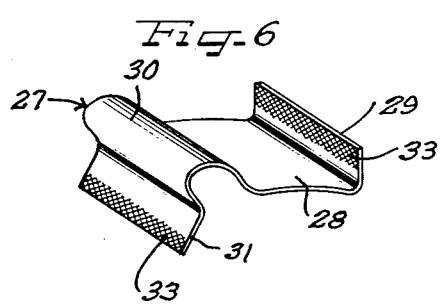
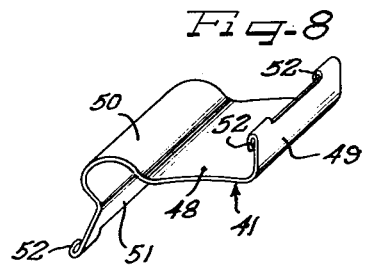
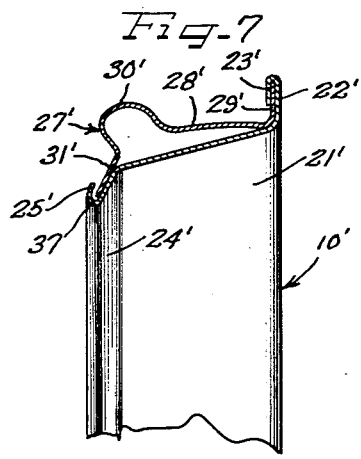
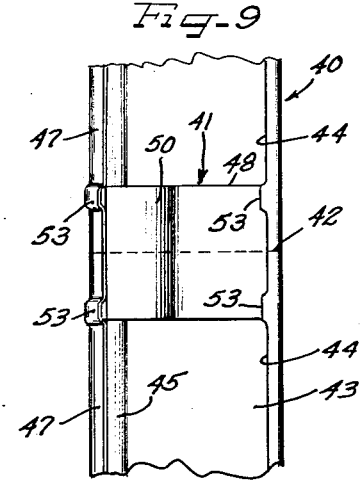
Inventor
George Albert Lyon
by   Hill Sherman Meroni Gross Simpson
Attys.

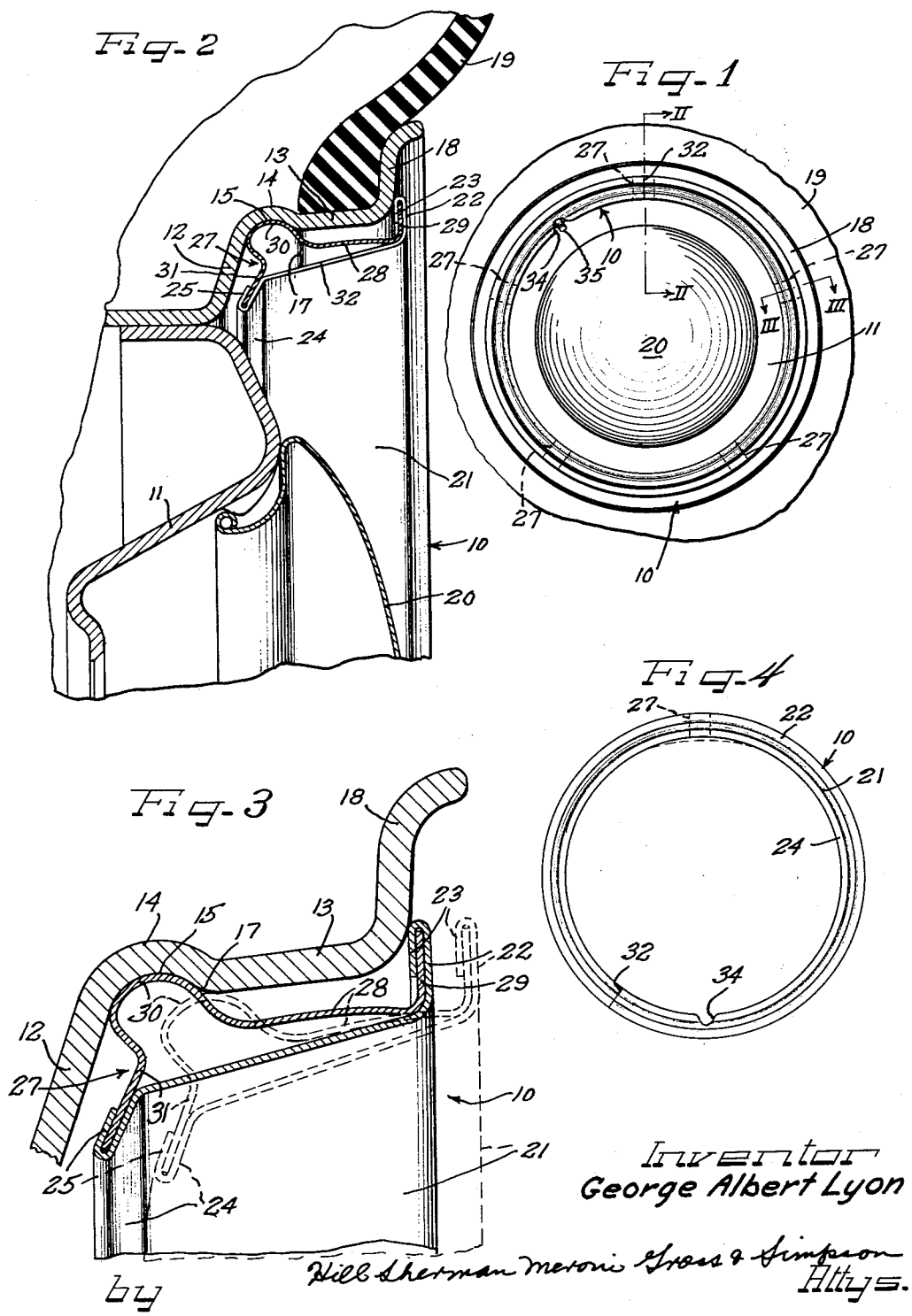

United States Patent Office 3,006,691
Patented Oct. 31, 1961

3,006,691
WHEEL COVER
George Albert Lyon, 13881 W. Chicago Blvd.,
Detroit, Mich.
Filed May 19, 1958, Ser. No. 736,023
8 Claims. (Cl. 301—37)

The present invention relates to improvements in wheel structures and more particularly concerns the ornamental and protective covering of the outer sides of vehicle wheels.

An important object of the present invention is to provide improved means for retaining a wheel trim or cover device in place on a vehicle wheel.

Another object of the invention is to provide an improved trim ring type of cover for disposition over the outer side of a vehicle wheel tire rim.

A still further object of the invention is to provide improved retaining means in a trim ring assembly for engagement with a wheel having a tire rim shoulder for inter-engagement with the retaining means.

Still another object of the invention is to provide a novel cover retaining finger clip structure with which the associated cover is coactive to afford resilient tensioned engagement of the finger clip with a wheel part.

Yet another object of the invention is to provide an improved trim ring and retaining spring finger clip assembly wherein the finger clip serves as a joint connector for split ends of the trim ring component of the assembly.

Other objects, features and advantages of the present invention will be readily apparent from the following detailed description of certain preferred embodiments thereof taken in conjunction with the accompanying drawings, in which:

FIGURE 1 is an outer side elevational view of a wheel structure embodying features of the invention;

FIGURE 2 is an enlarged fragmentary radial sectional detail view taken substantially on the line II—II of FIGURE 1;

FIGURE 3 is a substantially enlarged fragmentary sectional detail view taken substantially on the line III—III of FIGURE 1 and showing how the spring retaining finger clip is snapped into and out of a retaining shoulder groove on the tire rim, accompanied by resilient flexing of the associated trim ring member;

FIGURE 4 is a small scale outer face elevational view of the trim ring showing how the trim ring flexes as an incident to press-on and pry-off movement relative to the tire rim shoulder;

FIGURE 5 is a fragmentary rear elevational view of the trim ring member showing the spring finger clip that retains the split ends of the trim ring together and taken on a scale that is somewhat larger than in FIGURE 2;

FIGURE 6 is an isometric view of one of the spring finger clips;

FIGURE 7 is a sectional detail view of a slight modification;

FIGURE 8 is an isometric view of a modified form of the retaining finger clip; and FIGURE 9 is a rear elevational view of a trim ring embodying the retaining spring clip finger of FIGURE 8.

Having reference to FIGURES 1 and 2, a cover member in the form of a trim ring 10 is constructed and arranged to be applied in press-on, pry-off relation to the outer side of a vehicle wheel such as an automobile wheel including a disk spider wheel body 11 supporting a multi-flange, drop center tire rim including an outer side flange 12 merging with an intermediate generally axially outwardly extending flange 13 on a generally radially outwardly extending annular rib 14 providing a generally radially inwardly opening annular groove 15 defined by a generally radially and axially inwardly facing shoulder 17. At its axially outer end the intermediate flange 13 merges with a generally radially and then axially outwardly extending terminal flange 18. A pneumatic tire 19 of the tubeless type may be supported by the tire rim. At its center the wheel body 11 may be covered by a conventional hub cab 20.

In the present instance, the cover member 10 is dimensioned to substantially cover the outer side of the tire rim and for this purpose includes an annular body portion 21 of somewhat smaller diameter than the inside diameter of the intermediate flange 13 and disposed in a generally radially and axially inwardly sloping plane so as to be telescoped in substantially spaced relation within the intermediate flange 13 and with the axially inner end portion of the ring body portion 21 generally divergently spaced from the rim groove 15. At its axially outer end the ring body 21 has a generally axially outwardly extending marginal flange 22 of a diameter to overlie the radially inner portion of the terminal flange 18 and especially the juncture portion between the intermediate flange 13 and the terminal flange, with an underturned flange 23 providing a reinforcing and finishing edge for the marginal portion and arranged to seat upon the radially inner terminus of the terminal flange 18. At its inner end the body portion 21 of the trim ring has a generally radially and axially inwardly angled inner marginal portion 24 which is adapted to overlie the radially inner portion of the side flange 12 and has an under turned reinforcing and finishing flange 25.

According to the present invention means are provided on the tire rim opposing side of the trim ring cover member 10 for press-on, pry-off retaining interengagement within the tire rim groove 15 behind the shoulder 17. To this end, a suitable circumferentially spaced series of retaining finger clips 27 is attached to the trim ring member 10, there being five of the clips shown in FIGURE 1, but a smaller or larger number may be used as preferred or required. Each of the clips 27 is preferably constructed from suitable stiffly resilient spring steel or like stock of substantial width for strength and stability and constructed and arranged to coact with the resilient material of the trim ring 10 at least in part for resilient radially inward deflectional movement in pressing the finger clip into retaining engagement past the shoulder 17 or for prying the clip out of such engagement. To this end each of the finger clips includes a generally axially extending strip-like body portion 28 having an axially outer generally radially outwardly extending terminal flange 29 which is nested into the marginal portion 22 of the trim ring and is crimped into interlocked relation therewith by the underturned flange 23, being retained against radially inward displacement from the interlocked relation by shouldering of the juncture of the flange 29 with the body portion 28 in the corner at juncture of the ring body 21 with the marginal portion 22, as best seen in FIGURES 2 and 3. From the nested junctures, the clip finger body portion 28 diverges from the opposing face of the ring body 21 within the space between the ring body 21 and the intermediate flange 13 of the tire rim in the assembly with the wheel. At its axially inner end the finger clip body portion 28 has a generally radially and axially outwardly projecting and generally axially inwardly extending retaining loop 30 dimensioned for retaining engagement with the rim groove 15 and, as shown, including a portion facing generally radially and axially outwardly and engaging the shoulder 17. The clip 30 normally projects to a slightly greater diameter than the diameter in the bottom of the groove 15. The axially inner side of the loop 30 is return-bent generally axially outwardly and joins an integral generally radially and axially inwardly extending terminal flange portion 31 generally complementary in plane to the ring inner terminal annular flange 24 and nested therewith and retained interlockingly by the underturned ring flange 25.

An advantage of the particular construction of the trim ring 10 and the retaining clips 27 resides in that the trim ring may be made from thin, low cost material such as aluminum, cold rolled steel, and the like, although it may, of course, be made from stainless steel or brass if preferred. The material of the trim ring may be strip stock rolled into shape and with the free ends of the strip joined on a juncture 32. For economy purposes, the joint 32 is adapted to be maintained with the ends in close abutment and without any other securing or retaining means than one of the retaining finger clips 27 (FIGS. 1, 2 and 5). To this end, the selected retaining finger clip 27 is assembled to lie substantially equally across the joint 32, and the retaining flanges 23 and 25, respectively, of the trim ring tightly grip the associated terminal flanges 29 and 31 of the finger clip to thus retain the joint 32 as tight as practicable. This interconnection and locking is enhanced by gripping means provided on the respective clip flanges 29 and 31, in the present instance comprising a roughening of the axially inner faces of the clip flanges as indicated at 33, as by means of knurling. The outer sides of the flanges are preferably left smooth so that in the crimping as little distortion as possible of the engaged marginal portions of the trim ring will occur. Even substantial distortion of the lapping portions of the underturned marginal flanges 23 and 25 of the trim ring due to crimping, gripping of the roughened opposing faces of the clip flanges is entirely unobjectionable because all such distortion is concealed behind the trim ring.

In applying the ring member 10 to the outer side of the wheel, a valve stem notch 34 in the inner margin of the trim ring, preferably located between two of the retaining clips 27 is registered with a valve stem 35. In doing so, the trim ring may be canted toward the tire rim, thus initially shouldering the retaining shoulder loops 30 of the two retaining clips flanking the valve stem notch 34 into the rim groove 15. The remainder of the ring 10 is then pressed axially inwardly toward the retained engagement with the rim. In so doing, the loops 30 of the retaining clips on the opposite side of the ring from the valve stem notch 34 cam against the inner face of the intermediate flange 13 and in the continued axially inward pressure, flex radially inwardly, accompanied by resilient radially inward flexing of the inner margin of the ring member 10 as shown in dash outline in FIGURES 3 and 4 as a result of thrust of the terminal flange 31 into the underturned ring flange 25. It will be noticed that this terminal flange 31 is in general thrust alignment with the rim-shoulder-engaging portion of the loop 30 of the retaining finger clip 27. This results in building up substantial resilient tension so that when the retaining clip loops 30 snap behind the shoulder 17 into the groove 15 a snug tensioned engagement of the retaining clip loops behind the shoulder 17 is attained and then maintained while the retaining clips are in the ring retaining assembled relationship with the rim.

Removal of the cover is effected by applying a pry-off tool such as a screwdriver or the like behind the reinforced outer marginal portion 22 of the retaining ring and applying pry-off leverage force generally axially outwardly to dislodge one or more of the retaining clips 27. It is generally found that after two of the retaining clips have been released from behind the shoulder 17, the ring readily may be pulled away from the wheel. During the pry-off withdrawal of the respective retaining clip shoulder loops 30, resilient yielding of the inner margin of the ring as depicted in dash outline in FIGURES 3 and 4 facilitates dislodgment of the respective retaining clip fingers.

In the modification of FIGURE 7, a trim ring 10' is shown which in general respects is the same as the trim ring 10 and primed reference numerals are therefore used to indicate identical parts. Instead of being a split ring held together by one of the clips as described in connection with the ring 10, the trim ring 10' may be a one piece stamped or drawn member. The trim ring member 10' may also be made from a somewhat stiffer material, and for this purpose the innermost terminal 31' of the retaining clips 27', instead of being crimped and locked fixedly to the inner marginal flange 24' of the trim ring by the underturned flange 25' may be relatively loosely engaged within a groove 37 defined by the underturned flange 25' with the marginal flange portion 24', which groove opens generally radially outwardly to accommodate the clip terminal 31' in limited generally radially slidable relation. Normally the tip of the finger terminal flange 31' does not bottom in the groove 37 and this affords a limited range of flexing movement of the clip 27' and more particularly the shoulder flange portion 30' thereof relative to the trim ring during press-on and pry-off action. Nevertheless, there may still be a slight amount of radially inward resilient flexing of the inner margin of the trim ring after the end of the inner end terminal flange 31' bottoms within the groove 37.

Where at least with respect to the retaining clip finger that serves as the joint-connector for a split ring form of the trim ring it is desired to provide more positive joint maintaining interlock between the finger clip and the trim ring, the form of the invention shown in FIGURES 8 and 9 may be utilized. In this form of the invention a trim ring 40 of the split ring type utilizes a retaining finger clip 41 for retaining the ends of the ring member in a tight joint 42 similarly as one of the retaining clip fingers 27 retains the joint 32 of the trim ring 10. The trim ring 40 includes a ring body 43 having an underturned outer marginal portion 44 and an inturned inner marginal flange 45 having an underturned flange portion 47.

The retaining finger clip 41 is in general respects of similar construction as the retaining finger clip 27. To this end, the clip 41 has a body portion 48 provided with an axially outer terminal flange 49. At its axially inner end the clip 41 has a loop shoulder portion 50 from which extends a generally radially inwardly directed terminal flange 51.

For effecting an especially secure interlock connection between the terminal flanges of the retaining clip 41 and the underturned flanges 44 and 47 of the trim ring 40, lugs 52 projecting generally axially inwardly on the edges of the respective terminal flanges 49 and 51 of the retaining clip are provided for crimped interengagement interlockingly with the underturned marginal flanges of the trim ring margins. In this instance the lugs 52 are provided on the opposite side portions of the flanges 49 and 51 of the clip as extension portions turned under to provide the lugs. The underturned marginal flanges 44 and 47 of the ring have interlock bosses 53 within which the lugs 52 are retainingly interlocked whereby to positively hold the joint 42 tight and against separation. It will be understood, of course, that the bosses 53 will be formed as an incident to crimping of the flanges 44 and 47 respectively into engagement with the retaining clip terminal flanges. Functioning of the trim ring 40 will be the same as described in connection with the trim ring 10.

Various features of the several modifications may, of course, be interchangeably used.

Insofar as the use of the retaining finger clip for retaining the split ring joint is concerned, the finger clip may if preferred be of a resilient springy construction to yield in snapping into or out of engagement with the retaining shoulder means on the wheel rather than relying on the ring to yield as where the finger clips are of a stiffer material.

It will be understood that modifications and variations may be effected without departing from the scope of the novel concepts of the present invention.

I claim as my invention:

1. In a wheel structure including a tire rim having a generally radially inwardly facing annular flange with a generally radially and axially inwardly facing shoulder thereon, a trim ring cover member for disposition over the tire rim including radially inner and outer marginal portions, and a retaining finger clip behind the trim ring and having opposite terminal ends engaged with said marginal portions, the radially outermost of said marginal portions having an underturned flange crimpingly engaging the associated finger clip terminal, the radially innermost marginal portion having an underturned flange providing an abutment against which the associated finger clip terminal is thrustingly engageable, the finger clip having an intermediate generally radially outwardly projecting shoulder loop portion including a portion facing generally radially and axially outwardly and retainingly engageable in snap-on pry-off relation with the rim flange shoulder, said inner margin engaging terminal of the clip finger being in general thrust alignment with the rim-shoulder-engaging portion of the shoulder loop portion and resiliently deflecting the contiguous portion of the trim ring cover by said thrusting abutment with said underturned inner marginal flange as an incident to radially inward deflection of said shoulder loop portion in moving into and out of engagement with said rim flange shoulder.

2. In a wheel structure including a tire rim having an intermediate flange and a terminal flange merging with the axially outer end of the intermediate flange, a trim ring for disposition over the tire rim including a circular body portion for telescopic spaced disposition relative to the intermediate flange and having a generally radially outwardly turned marginal portion for overlying the terminal flange, said trim ring having an inner marginal portion spaced generally radially and axially inwardly relative to said outwardly turned marginal portion, said marginal portions having underturned flanges thereon, and a circumferentially spaced series of generally axially elongated retaining spring clip fingers having terminals engaged within said underturned flanges and with an intermediate generally radially outwardly projecting retaining projection portion retainingly engageable with the intermediate flange, said retaining spring clip finger being substantially resiliently stiff and having said retaining projection portion closely adjacent to one of said terminals and said one terminal thrusting into the associated underturned flange, the trim ring being resiliently locally deflectable generally radially inwardly contiguous to said one terminal of the retaining spring fingers for generally radially inward deflection of the finger clips and thereby said retaining projection portion from a larger diameter than the engaged diameter of the intermediate flange and thereby affording resilient tensioning of the retaining projection portions of the finger clips for enhancing the retaining grip of said projecting retaining portions against the intermediate flange.

3. In a wheel structure including an intermediate flange having a groove therein affording a generally radially and axially inwardly facing shoulder, a trim ring for disposition over the tire rim having therebehind a circumferentially spaced series of cover retaining spring finger clips provided with terminals engaging the trim ring and having a generally radially outwardly projecting intermediate loop portion retainingly engageable in snap-on pry-off relation within said groove behind said rim shoulder, said loop being adjacent to one of said finger clip terminals and spaced substantially from the other of said terminals and acting to deflect the adjacent terminal and the contiguous portion of the trim ring resiliently flexibly radially inwardly incident to passage of the loop over said shoulder in pressing the same toward said groove and in removing the same from said groove.

4. In a cover for disposition over the outer side of a vehicle wheel, generally radially and axially spaced portions having underturned flanges, and a retaining finger clip having terminals engaged between said underturned flanges and the contiguous portions of the cover, said finger clip having a stiff generally radially projecting shoulder for engagement with a wheel part and disposed adjacent to one of said terminals and spaced substantially from the other of said terminals, said one terminal and the adjacent portion of the cover member being resiliently radially deflectable incident to radial deflections of said finger clip shoulder in engagement with the wheel part.

5. In a cover for disposition over the outer side of a vehicle wheel, generally radially and axially spaced portions having underturned flanges, and a retaining finger clip having terminals engaged between said underturned flanges and the contiguous portions of the cover, said finger clip having a stiff generally radially projecting shoulder for engagement with a wheel part and disposed adjacent to one of said terminals and spaced substantially from the other of said terminals, said one terminal and the adjacent portion of the cover member being resiliently radially deflectable incident to radial deflections of said finger clip shoulder in engagement with the wheel part, said one terminal being loosely engaged relative to the adjacent underturned flange so as to have a limited range of relative movement longitudinally of the finger clip.

6. In a trim ring construction, a trim ring body of split ring structure having the ends joined together, and a retaining clip holding said ends thus joined, the trim ring having marginal underturned flanges, the clip having terminal portions lying across the juncture of said ends, and said underturned flanges gripping said terminals, said terminals having interlocking structure thereon facing toward the underturned flanges with which said underturned flanges are pressed interlockingly.

7. In a trim ring construction, a trim ring body of split ring structure having the ends joined together, and a retaining clip holding said ends thus joined, the trim ring having marginal underturned flanges, the clip having terminal portions lying across the juncture of said ends, and said underturned flanges gripping said terminals, said terminals having interlocking structure thereon with which underturned flanges are interlockingly engaged, said interlocking structure comprising a roughened surface formation on the clip terminals into which the underturned flanges are pressed.

8. In a trim ring construction, a trim ring body of split ring structure having the ends joined together, and a retaining clip holding said ends thus joined, the trim ring having marginal underturned flanges, the clip having terminal portions lying across the juncture of said ends, and said underturned flanges gripping said terminals, said terminals having interlocking structure thereon with which said underturned flanges are interlockingly engaged, said interlocking structure on the clip terminals comprising lugs bent therefrom and the underturned flanges having embossments interlockingly engaging said lugs.

References Cited in the file of this patent

UNITED STATES PATENTS

| 1,041,062 | Funk | Oct. 15, 1912 |
| 1,855,023 | Kellogg | Apr. 19, 1932 |
| 1,933,496 | Jandus | Oct. 31, 1933 |
| 2,212,038 | Lyon | Aug. 20, 1940 |
| 2,345,283 | Mulhern | Mar. 28, 1944 |
| 2,639,948 | Grimshaw | May 26, 1953 |
| 2,652,287 | Lyon | Sept. 15, 1953 |
| 2,732,261 | Lyon | Jan. 24, 1956 |
| 2,785,777 | Horn | Mar. 19, 1957 |

FOREIGN PATENTS

| 852,711 | France | Nov. 9, 1939 |